United States Patent [19]
Smith

[11] Patent Number: 6,050,143
[45] Date of Patent: *Apr. 18, 2000

[54] FLUID FLOW SYSTEM AND METHOD FOR SENSING FLUID FLOW

[75] Inventor: Richard Michael Smith, Salisbury, Md.

[73] Assignee: Dresser Industries, Inc., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/176,483

[22] Filed: Oct. 21, 1998

[51] Int. Cl.[7] .............................. G01F 3/14; G01F 15/00; G01B 7/14

[52] U.S. Cl. .................. 73/239; 73/861.77; 324/207.17; 324/207.2

[58] Field of Search ........................... 73/861.77, 861.78, 73/239, 261, 247; 324/207.17, 207.2

[56] References Cited

U.S. PATENT DOCUMENTS

| | | | |
|---|---|---|---|
| 4,641,522 | 2/1987 | Lopresti | 73/261 |
| 4,781,066 | 11/1988 | Pope et al. | 73/247 |
| 5,045,920 | 9/1991 | Vig et al. | |
| 5,070,298 | 12/1991 | Honda et al. | |
| 5,275,043 | 1/1994 | Cotton | 73/261 |
| 5,442,283 | 8/1995 | Vig et al. | |
| 5,532,583 | 7/1996 | Davis et al. | |
| 5,553,493 | 9/1996 | Box et al. | 73/261 |
| 5,581,179 | 12/1996 | Engel et al. | |
| 5,596,271 | 1/1997 | Lowery | |
| 5,617,819 | 4/1997 | Dery et al. | |
| 5,621,319 | 4/1997 | Bilotti et al. | |
| 5,627,465 | 5/1997 | Alfors et al. | |
| 5,648,606 | 7/1997 | Spalding | 73/247 |
| 5,694,039 | 12/1997 | Alfors | |
| 5,721,486 | 2/1998 | Pape | |
| 5,811,676 | 9/1998 | Spalding et al. | 73/247 |

*Primary Examiner*—Harshad Patel
*Attorney, Agent, or Firm*—Haynes & Boone, L.L.P.

[57] ABSTRACT

A fluid flow system and method according to which a fluid flow meter is provided that receives fluid and has an internal member that rotates in response to fluid flow through the meter. A self-contained, battery-operated sensor is disposed adjacent to, but externally of, the meter and functions to sense the rotation of the member. The sensor includes a display device that responds to the sensing of the rotation, and therefore the fluid flow through the meter, and provides a corresponding output signal. Thus, a service technician can be assured of the status of fluid flow through the system.

7 Claims, 1 Drawing Sheet

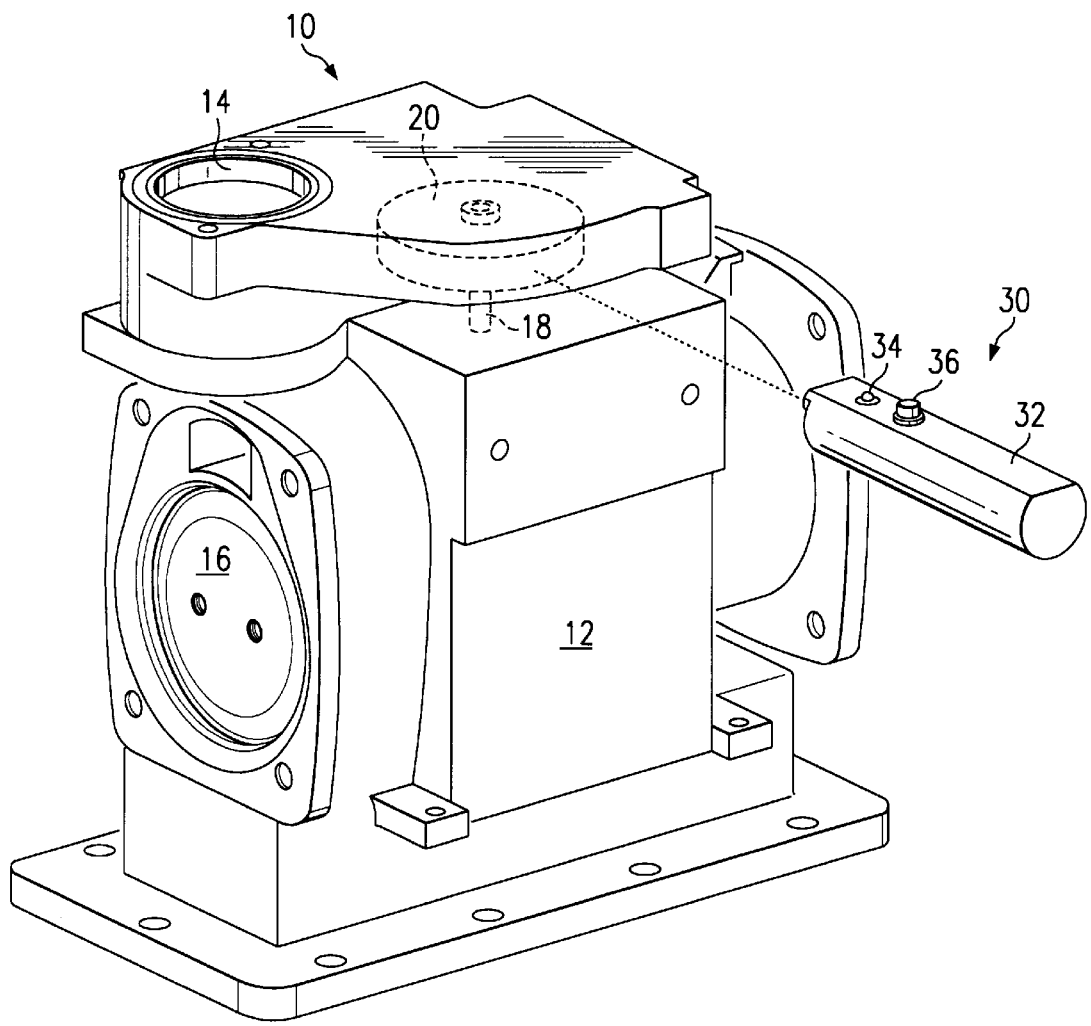

FLUID FLOW SYSTEM AND METHOD FOR SENSING FLUID FLOW

BACKGROUND OF THE INVENTION

The present invention relates to a fluid flow system and a method for sensing the flow of fluid through a fluid meter in the system, and, more particularly, to such a system and method in which the sensing is performed externally of the meter.

In fluid flow systems in which fluid is pumped through a network, of conduits and a meter is provided for metering the fluid flow, there is often a need to determine whether or not fluid is actually flowing through the meter independently of any display associated with the meter. However, this is impossible in connection with many modern fluid meters that have no exposed moving parts that car be observed to tell whether or not there is, in fact, fluid flow through the meter. Therefore, when the pump associated with the flow system is supposedly on, yet the display associated with the meter is not registering, the service technician does not know for sure whether or not the pump is functioning and the display is malfunctioning, or whether the pump is actually malfunctioning. This is especially critical in connection with a fluid flow system for a hazardous fluid, such as gasoline that is dispensed through a dispensing station at a service station.

Although several devices have been proposed to detect whether or not fluid is flowing through a meter, most of these devices require a probe, or the like, that has to be inserted into a meter. This requires a disassembly of the meter which is labor intensive, time consuming, and costly.

Therefore, what is needed is a fluid flow system and a method for sensing fluid flow through a meter in the system without having to insert a sensor in the meter.

SUMMARY OF THE INVENTION

According to the present invention, a fluid flow system is provided that includes a fluid flow meter having an internal member that rotates in response to fluid flow through the meter. A self-contained, battery-operated sensor is disposed adjacent to, but externally of, the meter and functions to sense the rotation of the member. The sensor includes a display device that responds to the sensing of the rotation, and therefore the fluid flow through the meter, and provides a corresponding output signal.

The present invention enjoys several advantages. For example, fluid flow through the meter can be easily and quickly detected without having to insert a sensor or probe into the meter. Also, the sensor can operate a relatively long distance from the meter when compared to other sensors, including standard Hall sensors. Further, the sensor is self-contained, battery operated, and can easily be held.

BRIEF DESCRIPTION OF THE DRAWING

The drawing is an isometric view showing the fluid flow system of the present invention.

DESCRIPTION OF THE PREFERRED EMBODIMENT

With reference to the drawing, the reference numeral 10 refers in general, to a fluid flow meter which includes a housing 12 having an inlet 14 for receiving the fluid to be metered, and an outlet (not shown) for discharging the fluid. An internal chamber is formed in the housing 12 which receives two pistons, one of which is shown by the reference numeral 16. The pistons 16 are connected to the ends of a connecting rod assembly (not shown), it being understood that the housing 12 is provided with covers that normally cover the pistons. The meter 10 forms a portion of a fluid flow system including conduits (not shown) connected to the inlet 14 and the meter outlet, and a pump (not shown) that pumps fluid through the conduits and the meter in a conventional manner.

When fluid is introduced into the inlet 14 of the meter 10, it passes into a chamber in the housing 12 which houses the pistons 16 and the rod assembly, and causes reciprocal movement of the pistons to drive a crank shaft, shown partially by the reference numeral 18. A magnetic disc 20 is connected to an end of the crank shaft 18 and rotates with the crank shaft to generate a corresponding output signal, in the form of a pulsating magnetic field. The meter 10 includes a sensor (not shown), such as a Hall effect sensor, which responds to the magnetic field from the disc 20 and provides a corresponding signal which is passed to an external display device. If the meter 10 is used in a gasoline dispensing system, for example, the display device would display the gallons dispensed and the corresponding cost of same. Since the meter 10 is disclosed in detail as part of a duplex meter assembly in U.S. patent application Ser. No. 08/847,693, the disclosure of which is incorporated by reference, the meter will not be described in any further detail.

The sensor of the present invention is shown, in general, by the reference numeral 30 and preferably is of the type marketed under model Nos. ATS610LSA and ATS 611LSB by Allegro Microsystems, Inc. of Worcester, Mass. These types of sensors are dynamic, peak-sensing, differential hall-effect gear-tooth devices that are designed to sense pulsating magnetic fields for various applications not related to fluid flow meters, such as, for example, in connection wits automobile braking systems. In general, these sensors include a conventional "Hall" sensor with a magnet associated therewith to provide a magnetic field that will be distorted when the sensor is placed in proximity to a moving magnetic field. This distortion, or interference, between the respective magnetic fields of the sensor and the device being sensed is sensed by the Hall sensor which provides a corresponding output signal. As a result, these sensors can sense the presence of a moving magnetic field from a relatively long distance when compared to a standard Hall effect sensor. These types of hall effect and gear tooth sensors are disclosed in detail in U.S. Pat. Nos. 5,045,920; 5,442,283; 5,581,179; and 5,561,319 the disclosures of which are hereby incorporated by reference.

The sensor 30 is a self-contained, hand-held, battery powered, version of the above described sensor, and is designed to sense the moving magnetic field produced when the magnetic disc 20 of the meter 10 rotates. The sensor includes a housing 32 containing the electronics to achieve the functions described above and a battery for powering the sensor. A light-emitting diode 34 and a push button 36 are mounted on the housing 30 for providing a visual indication of the operation of the sensor 30 and for activating same, respectively, as will be described.

When the pump of the above fluid flow system is activated and supposedly pumping, and it is desired to check to see if fluid is, in fact, flowing through the meter 10 notwithstanding the reading on the display associated with the meter, the service technician grasps the sensor 30 and places it adjacent a wall of the housing 12. Preferably a wall of the housing 12 is selected which is closest to the magnetic disc 20, which, in the example shown in the drawing, is one of the side walls of the housing 12. The technician then pushes the button 36 to activate the sensor 30 which causes the diode 34 to turn on. If, in fact, fluid is flowing through the housing 12 of the meter 10 and the magnetic disc 20 is thus rotating, the sensor 30 will sense the resulting pulsating magnetic field generated by the rotating disc and generate a corresponding output. The diode 34 will respond to the output and blink on and off, to provide an indication of fluid flow. If there is no fluid flow, the device 24 will not blink but, rather, will remain turned on until the button 36 is released. In either case, the technician will be assured of the status of the fluid flow through the system.

The present invention thus enjoys several advantages. For example, fluid flow through the meter 10 can be easily and quickly detected without having to insert a sensor or probe into the meter. Also, the sensor 30 will operate a relatively long distance from the magnetic disc 20 when compared to other sensors, including standard Hall sensors. Further, the sensor 30 is self-contained, battery operated, and can easily be held.

It is understood that variations may be made in the foregoing without departing from the scope of the present invention. For example, the meter 10 may be a part of a duplex meter system disclosed in the above-identified U.S. patent application. Also, the sensor 30 is not limited to use with the particular fluid flow meter described above but can be used with any meter that incorporates a magnetic disc of the type discussed above. Further, the sensor 30 can be adapted to respond to rotation of any type of rotating member in the housing 12. Also, the sensor 30 can be provided with any type of visual display other than a light-emitting diode discussed above. Still further the sensor 30 can response to the presence of the magnetic field in a manner other than by providing a display, such as, for example, by vibrating in response to the presence of the magnetic field. Also, the sensor 30 can be mounted on, or adjacent to, the meter 10.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for sensing the flow of fluid through an internal magnetic fluid flow meter having a member that rotates in response to fluid flow through the meter and produces a corresponding magnetic field, the method comprising the steps of providing a magnet externally of the meter that produces a magnetic field, manually moving the magnet in proximity to the magnetic field produced by the rotating member so that the respective magnetic fields interfere with each other, providing a sensor for sensing the interference between the magnetic fields and producing a corresponding output signal that corresponds to fluid flowing through the meter.

2. The method of claim 1 further comprising the step of providing a signal device that responds to the output signal of the sensor and produces a corresponding visual signal.

3. The method of claim 2 wherein the signal device is a light-emitting diode.

4. The method of claim 2 wherein the signal device vibrates to produce the output.

5. The method of claim 2 further comprising the step of providing a self-contained, battery-operated gear tooth sensor for sensing the interference between the magnetic fields.

6. The method of claim 5 further comprising the step of placing the magnet, the sensor, and the signal device in a housing that is separate from the meter.

7. The method of claim 6 wherein the housing is normally stored in a location out of the magnetic field produced by the rotating member and further comprising the step of manually moving the sensing device into the latter magnetic field when the meter is operating.

\* \* \* \* \*